US012163626B2

(12) United States Patent
Biscette et al.

(10) Patent No.: US 12,163,626 B2
(45) Date of Patent: Dec. 10, 2024

(54) CRYOSTAT FOR OPERATION WITH LIQUID HELIUM AND METHOD OF OPERATING THE SAME

(71) Applicant: Universitat Zurich, Zurich (CH)

(72) Inventors: Dominik Biscette, Zurich (CH); Johan Chang, Zurich (CH); Denys Sutter, Zurich (CH)

(73) Assignee: UNIVERSITAT ZURICH, Zurich (CH)

( * ) Notice: Subject to any disclaimer, the term of this patent is extended or adjusted under 35 U.S.C. 154(b) by 393 days.

(21) Appl. No.: 17/429,027

(22) PCT Filed: Feb. 7, 2020

(86) PCT No.: PCT/EP2020/053216

§ 371 (c)(1),
(2) Date: Aug. 6, 2021

(87) PCT Pub. No.: WO2020/161343

PCT Pub. Date: Aug. 13, 2020

(65) Prior Publication Data

US 2022/0178497 A1 Jun. 9, 2022

(30) Foreign Application Priority Data

Feb. 7, 2019 (EP) .................................... 19155977

(51) Int. Cl.
*F17C 3/08* (2006.01)

(52) U.S. Cl.
CPC .................................... *F17C 3/085* (2013.01)

(58) Field of Classification Search
CPC ...... F17C 2201/0109; F17C 2205/0341; F17C 2221/017; F17C 2223/0161; F17C 2270/0509; F17C 3/085; F17C 6/00
See application file for complete search history.

(56) References Cited

U.S. PATENT DOCUMENTS 3,442,091 A * 5/1969 Elsner ..................... F17C 3/085 62/50.1
3,983,714 A 10/1976 Fletcher et al.
(Continued)

FOREIGN PATENT DOCUMENTS

EP 1310766 A 3/1973
JP 2016188737 A 11/2016
(Continued)

OTHER PUBLICATIONS

Machine Translation of RU 88420 to Ivanovic et al. "Helium cryostat", Nov. 10, 2009.; description; all pages; eSpacenet (Year: 2009).*
Ekin, J.W., "Experimental Techniques for Low Temperature Measurements—Cryostat Design, Material Properties, and Superconductor Critical-Current Testing" Oxford University Press (2006) Abstract.
(Continued)

*Primary Examiner* — Filip Zec
(74) *Attorney, Agent, or Firm* — Seager, Tufte & Wickhem, LLP

(57) ABSTRACT

A cryostat for operation with liquid helium, may comprise a primary chamber with a main region and a pot region for containing a bath of liquid helium-4, primary inlet means for introducing liquid helium-4 and primary outlet means for releasing gaseous helium-4, the primary inlet means comprising a transfer line extending into the primary region. The cryostat may be configured for operation under a continuous supply of liquid helium-4 and at a reduced helium-4 pressure, whereby gaseous helium-4 is pumped off through the outlet means. The primary chamber may comprise a baffle structure arranged between the pot region and the main region, the baffle structure defining at least one flowpath for the flow of gaseous helium-4, each flowpath forming a detoured connection between the pot region and the main region.

24 Claims, 5 Drawing Sheets

(56) References Cited

U.S. PATENT DOCUMENTS

| | | | | | |
|---|---|---|---|---|---|
| 4,136,526 | A | | 1/1979 | Chanin et al. | |
| 4,511,125 | A | * | 4/1985 | Hochstrasser | F27D 25/001 266/287 |
| 5,365,750 | A | | 11/1994 | Greenthal | |
| 5,499,277 | A | * | 3/1996 | Hunsbedt | G21C 15/18 376/290 |
| 6,463,757 | B1 | * | 10/2002 | Dickson | F25B 43/006 62/509 |
| 7,404,301 | B2 | * | 7/2008 | Huang | F25J 1/021 62/620 |
| 7,526,057 | B2 | * | 4/2009 | Sim | G21C 15/18 376/403 |
| 8,146,896 | B2 | * | 4/2012 | Cuvalci | C23C 16/4482 261/123 |
| 10,444,301 | B2 | * | 10/2019 | Ahonen | G01R 33/0354 |
| 11,482,345 | B2 | * | 10/2022 | Hunt | G21C 15/12 |
| 2015/0276129 | A1 | | 10/2015 | Retz et al. | |
| 2017/0094770 | A1 | * | 3/2017 | Kephart | H05H 7/22 |
| 2020/0032962 | A1 | * | 1/2020 | Knight | G01N 1/2035 |
| 2021/0222685 | A1 | * | 7/2021 | Liu | F04B 37/08 |

FOREIGN PATENT DOCUMENTS

| | | | |
|---|---|---|---|
| RU | 88420 | U1 | 11/2009 |
| SU | 529348 | A1 | 9/1976 |
| SU | 1118843 | A1 | 10/1984 |
| WO | 2020161343 | A1 | 8/2020 |

OTHER PUBLICATIONS

International Search Report for International application No. PCT/EP2020/053216, mailed on Jun. 17, 2020, 4 pages.

Van der Linden, P.J.E.M., et. al, “A compact and versatile dynamic flow cryostat for photon science”, Rev. Sci. Instr. 87, 115103 (2016).

Vovrosh, J., et al. “Additive manufacturing of magnetic shielding and ultra-high vacuum flange for cold atom sensors”, Sci Rep 8, 2023 (2018) 10 pages.

The First Office Action, CN Application No. 202080007365.0, Chinese Patent Office, Nov. 15, 2022 (7 pages) (English Translation attached).

* cited by examiner

CRYOSTAT FOR OPERATION WITH LIQUID HELIUM AND METHOD OF OPERATING THE SAME

PRIORITY

This application is a US national stage filing of international PCT application PCT/EP2020/053216, filed Feb. 7, 2020, which claims the benefit of priority to European Patent Application Serial No. EP19155977.2, filed Feb. 7, 2019, each of which are incorporated by reference herein in their entirety and for all purposes.

FIELD OF THE INVENTION

The present invention generally relates to a cryostat system for operation with liquid helium.

BACKGROUND OF THE INVENTION

A cryostat is a cooling device that enables a constant cold temperature environment. Generally, there exist dry and wet cryostats. Dry systems operate through closed gas compression or Peltier element methodology. Wet cryostats, by contrast, use liquid cryogens, particularly helium, as cooling media. Bath and flow cryostats constitute two different approaches to wet cryogenics. A flow cryostat functions by flowing liquid helium through a cold finger. In this fashion, compact cryostats with constant temperatures down to 3 K can be realized. Bath cryostats for helium typically involve an outer liquid nitrogen jacket to heat-shield the inner helium reservoir. Through a pumpable 1 K-pot connected to the main helium-4 reservoir, temperatures down to around 1.5 K can be reached. Adding an additional 1K-pot for helium-3 permits to reach 0.3 K.

However, these cryostat concepts have several drawbacks. Flow-cryostats are limited in the accessible base temperature and, in addition, have poor helium consumption efficiency. Bath cryostats, by contrast, have slow cooldown times and are voluminous due to large reservoirs of the cryogen, such as liquid helium and nitrogen. Moreover, their operation requires and internal cold needle valve.

A comprehensive overview of cryostat techniques may be found in Jack W. Ekin "Experimental Techniques for Low Temperature Measurements—Cryostat Design, Materials, and Critical-Current Testing" (2016) *Oxford University Press ISBN* 978-0-19-857054-7. A recent example of a flow cryostat has been described in van der Linden et. al, "A compact and versatile dynamic flow cryostat for photon science", *Rev. Sci. Instr.* 87, 115103 (2016).

SU 529348 A1 discloses a cryostat for a helium-4 bath designed to operate at ambient pressure. In order to reduce the evaporation rate of liquid helium, the cryostat has a neck formed as a corrugated tube with a plurality of external tailspins. The design appears to have been optimized for comparatively large size, as the drawing shows some kind of massive object immersed in the helium-4 bath and standing on a knife-edge type structure at the bottom of the bath container.

US 2015/0276129 A1 discloses a cryostat, particularly for use in magnetic resonance imaging (MRI) systems, and a method for reducing heat input into such a cryostat. The cryostat is designed to be transportable while maintaining cryogenic conditions in its core. During operation, a liquid cryogen, notably liquid helium-4, provides cooling of superconductive magnet coils of the MRI system. For this purpose, the liquid helium-4 is cooled by an active refrigerator device having a cooling head which is immersed in the liquid helium-4 bath. For transportation, the inoperative refrigerator device is removed and cryogenic conditions are maintained by the liquid helium-4. In order to minimize evaporative helium loss, a specifically configured insert is introduced into the opening previously holding the active refrigerator device. In particular, the insert defines a gas escape channel which is considerably longer than the length of the insert.

U.S. Pat. No. 5,365,750 A discloses a remote refrigerative probe which is intended for cooling environments such as aquarium tanks and certain other applications such as cooling of photographic processing baths. The probe is intended for immersion in the medium to be cooled, and it is connected to a condenser unit by an umbilical tube. Cooling of the medium surrounding the probe is achieved by thermal contact of the entire probe housing. To improve the cooling effect, a refrigerating fluid enters the probe in a central duct and is then directed back to the condenser unit along a spiraling path adjacent the inner surface of the probe housing.

SU 1118843 A1 discloses a "pipe in pipe" heat exchanger to be used in steam genera-tors and other high-voltage heat exchangers. It contains an inner lowering pipe and an outer pipe, muffled on one side by a lid, the inner surface of which comprises a spiraling surface.

U.S. Pat. No. 4,136,526 A discloses a portable helium-3 cryostat disposed inside a portable helium-4 cryostat, the latter being constituted in basically known manner by a Dewar jar for a bath of liquid helium-4.

SUMMARY OF THE INVENTION

In spite of a multitude of existing cryostat designs, there is still a need for an improved cryostat system. In particular, it would be desirable to have a cryostat with a compact, cost efficient design that nonetheless allows reaching temperatures in the range of 1.5 K to 1.8 K. This would also open the possibility of implementing a further cooling stage with helium-3 in an integrated compact design.

The above objects are achieved with the cryostat of the present invention.

The cryostat for operation with liquid helium comprises a primary chamber with a main region and a pot region for containing a bath of liquid helium-4, and further comprises primary inlet means for introducing liquid helium-4 and primary outlet means for releasing gaseous helium-4, the primary inlet means comprising a transfer line extending into the primary chamber. According to the invention

- the cryostat is configured for operation under a continuous supply of liquid helium-4,
- the cryostat is configured for operation at a reduced helium-4 pressure, whereby gaseous helium-4 is pumped off through the outlet means,
- the primary chamber comprises a baffle structure arranged between the pot region and the main region, the baffle structure defining at least one flowpath for the flow of gaseous helium-4, and
- each flowpath forms a detoured connection between the pot region and the main region.

The present invention provides an entirely new type of wet cryogenics. In essence, it consists of a pumpable heat exchanger in conjunction with a so-called "1 K-pot" in direct connection with an external helium Dewar. This construction maintains the same fundamental base temperature of bath cryostats while it can be miniaturized to the size of a finger tip. The essential part, i.e. the pumpable heat exchanger is a baffle structure, typically a spiral-like structure which can be manufactured by three-dimensional printing technology.

In comparison to bath cryostats, the invention provides a much-simplified concept that permits miniaturization. This allows compactness comparable (or better) to flow cryostats while keeping the fundamental base temperature of bath cryostat technology. The simplified design opens for faster and cheaper manufacturing. More importantly, the compactness enables entirely new cryogenic applications. Most notably, it provides practical solutions to in-situ vacuum manipulative cryogenics.

Unless explicitly defined otherwise, any positional indications such as “upper”, “lower”, “top”, “bottom”, “above” and “below” shall be understood in relation to a cryostat disposed in an operational position. It should be noted that depending on design, the cryostat can be operated in a vertical, horizontal or in any other position.

The cryostat of the present invention is designed for operation with a minimized bath of liquid helium-4, which can be maintained under reduced pressure, thereby reaching temperatures that are correspondingly lower than the 4.2 K boiling point at atmospheric pressure. For this purpose, the cryostat is configured for operation under a continuous supply of liquid helium-4 leading to formation of a bath of liquid helium-4 confined by a bottom surface of the primary chamber. A reduced helium-4 pressure is established by pumping off gaseous helium-4, which is continuously evaporating from the bath, through the outlet means by means of a pumping system connected to the cryostat’s outlet means. It is contemplated that the inventive principle could be applied to other cryogens such as liquid hydrogen or liquid nitrogen.

In general, the cryostat will include some suitable flanges or other connection means to allow insertion of the primary chamber into a high-vacuum environment. The term “continuous” in relation to the supply of liquid helium-4 shall be understood broadly, in particular to also include a supply over an extended period of time interrupted by short pauses. In other words, a continuous supply shall include a controlled flow of the medium which can be steady flow or patterned flow. A steady flow of the medium is generally preferred because an on-off operation could lead to the intrusion of gas in the transfer line which may cause heat leaks. “Controlled” shall have the meaning of providing a suitable rate in terms of the filling status of the liquid reservoir and in terms of the evaporation rate. The cryostat will also be generally equipped with various components known in the field, e.g. with temperature sensors, pressure gauges, resistive heaters, etc. According to the invention, the primary chamber contains a baffle structure positioned between the pot region and the main region. This baffle structure acts both as heat exchanging element and as an element constraining the flowpath of gaseous helium-4. Stated differently, the baffle acts as obstacle for a simple straight gas flow. Depending on design choice, the baffle structure defines at least one flowpath for gaseous helium-4. Importantly, any of these flowpaths shall form a detoured connection between the pot region and the main region. In other words, the baffle structure shall impede straight line connections starting from any point in the pot region, particularly from any point of the helium-4 bath surface, to the main region located above the baffle structure. So “detoured” shall be understood as equivalent to “indirect” or “non-straight”. In combination, the baffle structure of the present invention will provide heat exchange through contact of gaseous helium-4 with the surface of its heat exchanging elements. As well, it will form a flow restriction that allows maintaining a substantial pressure differential between the gaseous region just above the helium bath and the outlet means in the main region. It also effectively blocks unwanted heat intrusion by thermal radiation from the main main region.

The flow restriction is important in order to maintain the low pressure needed to maintain the liquid helium-4 bath at temperatures well below 4.2 K while keeping the pumping rate and concomitant helium consumption in an acceptable range.

Advantageous embodiments are defined in the dependent claims.

According to one embodiment, the baffle structure has a heat exchanging region with a heat exchanging area ($A_H$). The heat exchanging region is typically configured as a thin sheet with low thermal conductivity, preferably made of a low thermal conductivity metal over which the helium gas is forced to flow. Typically, the sheet has a thickness of 0.2 to 1 mm. In the present context, the term “low thermal conductivity” shall be understood as a thermal conductivity at 4K in the range of 0.01 to 10 W/(m K), particularly in the range of 0.1 to 1 W/(m K) and more particularly in the range of 0.2 to 0.4 W/(m K). The heat exchanging efficiency of the baffle structure depends on the total area ($A_H$) of the heat exchanging region. Depending on the construction of the baffle structure, the heat exchanging region may include certain wall sections that are in thermal contact with sheet-like elements defining the flowpath of gaseous helium-4.

According to a preferred embodiment, the ratio of heat exchanging area $A_H$ to average liquid/gas surface area $A_s$ of the pot region is at least 1, particularly at least 2, more particularly at least 5 and even more particularly at least 10 for any operational cryostat orientation. The term “any operational cryostat orientation” shall be understood to include any orientation preventing liquid helium from contacting the baffle structure and/or freely flowing out of the primary chamber.

In the present context, the pot region shall be understood as the part of the primary chamber which is suitable to contain the bath of liquid helium, i.e. which can be in contact with liquid helium in the case of maximum filling. When liquid helium is present in the pot region, the respective liquid/gas surface has an area that generally depends on the orientation of the cryostat, more specifically of the pot region thereof, and on the liquid level, i.e. it may increase or decrease when the cryostat is tilted and/or when the amount of liquid is changed. Nevertheless, for any given cryostat orientation in physical space, an average liquid/gas surface area $A_s$ can be defined unambiguously by averaging over all possible liquid levels in the pot region, i.e. for the range between empty and full pot region for a given shape and orientation of the pot region. The term “average” shall be understood here as the arithmetic mean. The average liquid/gas surface area $A_s$ may be calculated analytically in the case of certain simple shapes of the pot region whereas in all other cases it can be calculated numerically. Numerical calculations can be carried out using data from computer aided design (CAD) plans of the structure of interest.

According to another embodiment, the ratio of heat exchanging area $A_H$ to average cross-sectional area $A_c$ of the pot region perpendicular to a direction between pot region and main region is at least 1, particularly at least 2, more particularly at least 5 and even more particularly at least 10. For further explanation, in this embodiment the average cross-sectional area $A_c$ results from averaging over all cross sections of the pot region, whereas such cross sections are those perpendicular to the direction between the pot region and the main region. In cases of rather simple pot region shapes, e.g. a cylindrical body or a body with a longitudinal axis between the bottom of the pot region and the top of pot region, the cross sections of the pot region to be averaged can be those perpendicular to such axis. The term "average" shall be understood here as the arithmetic mean. The average cross-sectional area $A_c$ may be calculated analytically in the case of certain simple shapes of the pot region whereas in all other cases it can be calculated numerically.

The baffle structure can be configured in many ways as long as it impedes any straight-line connections starting from any point in the pot region to any point in the main region of the primary chamber, so that any connection therebetween is necessarily a detoured connection. According to a favorable embodiment, the baffle structure comprises at least one spiraled surface leading from the pot region to the main region of the primary chamber. It is also possible and convenient for the baffle structure to have at least one further, angularly offset spiraled surface. In such cases the baffle structure defines two or more detoured flowpaths starting from different locations in the pot region and ending in different locations in the main region.

In principle, the transfer line for delivering liquid helium-4 into the pot region can be disposed separately from the baffle structure, for example as a tubular channel arranged along a lateral wall of the primary chamber. According to an advantageous embodiment, the baffle structure comprises a longitudinal passage for receiving therein the transfer line. The term "receiving therein" shall imply that the transfer line could be inserted over the entire length of the longitudinal passage or that it is merely inserted into the upper-most section of the longitudinal passage. In some embodiments, the longitudinal passage is arranged substantially at the center of the baffle structure. According to one advantageous embodiment, the axial passage is formed as a tubular section integrally connected to the baffle structure.

According to a preferred embodiment, the baffle structure, and optionally any connected structures is/are made by a 3D-printing technique. This technique, which is also known as additive manufacturing, allows forming the baffle structure with any desired shape, e.g. with a plurality of angularly displaced spiraled surfaces and an integrally connected longitudinal passageway in a single piece. In one advantageous version which is particularly suitable for achieving a very compact cryostat design, the baffle structure is integrally formed with the primary chamber by means of a 3D-printing technique. Considering that for surface sensitive applications, such as e.g. photoemission electron spectroscopy, the primary chamber shall be mounted in an ultrahigh vacuum (UHV) environment, the issue of UHV compatibility of such a chamber formed by 3D-printing becomes important.

It has been a common perception that additive manufacturing of metal or plastic structures, which relies on some kind of sintering or compacting a material supplied in grainy form, is not directly compatible with UHV conditions. Indeed, many 3D printed structures are in fact not leak tight but this does not imply that UHV compatible 3D printed structures cannot be produced, see e.g. Vovrosh, J., Voulazeris, G., Petrov, P. G. et al. Additive manufacturing of magnetic shielding and ultra-high vacuum flange for cold atom sensors. *Sci Rep* 8, 2023 (2018). https://doi.org/10.1038/s41598-018-20352-x. It has been found that the degree of leak tightness depends on many different parameters such as the print material itself, the grain size of the starting material and the printing angle. It has also been found that initially leaking 3D printed structures can be made leak tight through different methodologies. For metal prints of permalloy-80, heat treatment has for example been shown to make 3D printed flanges compatible with conventional flanges, and UHV conditions have been obtained in this fashion.

In many applications it is preferable to arrange a radiation shield around certain regions of the cryostat in order to reduce radiative thermal load from surrounding warm structures. Therefore, according to one embodiment, the cryostat further comprises a radiation shield disposed substantially surrounding at least the pot section of the primary chamber. As well known from cryogenic technology, such a radiation shield may be cooled by thermal contact to an auxiliary cryogenic reservoir, particularly a liquid nitrogen reservoir. However, according to a particularly advantageous embodiment, the radiation shield is coolable by thermal contact to an outer wall portion of the primary chamber. Such thermal contact is advantageously made over a substantial part of the main region so as to ensure a sufficiently large contact area. In this embodiment, the radiation shield is cooled by transferring heat to the helium-4 gas which is being pumped off through the baffle structure. It has been found that this type of radiation shield embodiment in conjunction with a primary chamber integrally formed with the baffle structure allows reaching low temperatures of the helium-4 bath without the need of an additional (liquid nitrogen) reservoir, thus contributing to a compact design. For this purpose, the radiation shield is made of a material with good thermal conductivity such as copper. Although the cryostats according to the present invention can be realized with diverse types of primary chamber geometry, it is particularly advantageous if the primary chamber is substantially cylindrical. When operated with its cylindrical axis substantially vertical, both the average liquid/gas surface ($A_s$) and the average cross-sectional area ($A_c$) of the pot region correspond to the inner cylindrical surface below the baffle structure.

Sensible outer diameters of the primary chamber span from 0.001 to 1 m. Typically, the primary chamber has an inner diameter in the range of 2 to 200 mm, particularly 5 to 100 mm, more particularly 10 to 80 mm and most particularly about 20 to 30 mm. The chamber wall has a thickness of typically 0.2 to 1 mm. Typical cylinder lengths, including the heat exchanging detouring structure and the pot region, lie between 0.03 to 3 m. The total volume enclosed by the outer cryostat walls therefore ranges between $2.4\times10^{-8}$ and $2.4\ m^3$.

In accordance with the generally intended modes of operation as a helium-4 cryostat, an external surface of the pot region is provided with primary attachment means for external attachment of a sample. The term "external" shall be understood hear as referring to the side of the pot region which is not in contact with the helium-4 contained therein. In many instances, the primary attachment means will be arranged at the bottom surface of the pot region, i.e. underneath the pot region under operating conditions. However, the primary attachment means could also be arranged in some other region in close proximity to the liquid helium-4 bath, e.g. laterally therefrom. Such attachment means are generally known in cryogenics. They may be configured, for example and without limitation, as brackets, clamps, frames, perforated platelets or flanges. In many applications the attachment means are made from metallic and/or ceramic components. In contrast to certain applications where an object to be cooled is immersed in the cryogenic liquid contained in the cryostat, the provision of external attachment means allows placement of the sample in a region outside of the primary chamber, thereby substantially improving accessibility for manipulation and examination, including spectroscopic examination. It should be emphasized that the term "sample" shall apply to any object of interest which is requiring cryogenic conditions for some scientific, medical or materials technology reason.

According to an advantageous embodiment, the outlet means comprise coupling means for connecting to a helium pumping device. In a preferred embodiment the coupling means for connecting to a helium pumping device shall be gas-tight. The term "gas-tight" shall be understood as excluding a passage of any gases—including helium—from the inner region of the outlet means to the surrounding region and vice versa.

According to a particularly advantageous embodiment, the cryostat further comprises a secondary chamber for operation with helium-3, secondary inlet means for helium-3 and secondary outlet means for helium-3. In particular, such a cryostat can be configured for operation at a reduced helium-3 pressure in the secondary chamber, whereby gaseous helium-3 is pumped off through the secondary outlet means. As will be understood, such a design is generally intended to reach particularly low temperatures in the range of 0.3 to 0.4 K.

Advantageously, the secondary inlet means comprise a cannular transfer line which is configured for precooling supplied helium-3 by means of i) a curved section formed to substantially follow a flowpath of the baffle structure, and/or ii) a meandering or spiraling section formed in the cannular transfer line in a region thereof within the liquid helium-4 bath.

The secondary outlet means can be configured as a substantially straight tube. Alternatively, they can be configured as a curved section formed to substantially follow a flowpath of the baffle structure.

In accordance with the generally intended modes of operation as a helium-3 cryostat, an external surface of the secondary chamber is provided with secondary attachment means for external attachment of a sample. The types, configurations, positions and uses of such secondary attachment means are generally the same as for the above described primary attachment means, with the only difference that "external" is in reference to the secondary chamber.

According to a further aspect of the invention, a method for operating a cryostat as defined above comprises a cool-down phase followed by a stationary phase, wherein

- in the cool-down phase, liquid helium-4 is supplied from an external reservoir through the primary inlet means into the pot region thereby evaporatingly cooling the latter until a bath of liquid helium-4 starts to accumulate on a bottom surface of the pot region;
- in the stationary phase, a bath temperature of liquid helium-4 is maintained by regulating the inlet flow of liquid helium-4 and/or regulating the rate of pumping off gaseous helium-4 through the primary outlet means, and optionally by controlled heating.

According to an embodiment of the method, the bath temperature of liquid helium-4 is maintained in the range of 1.8 K to 2.0 K.

An embodiment for operating a cryostat equipped with a secondary chamber for helium-3 comprises the following procedure to be carried out in the stationary phase of the primary system, i.e. after having regulated the bath temperature of liquid helium-4 to a suitable, preferably as low as possible temperature: helium-3 is supplied from an external reservoir through the secondary inlet means into the secondary chamber thereby evaporatingly cooling the latter until a secondary bath of liquid helium-3 is formed, followed by maintaining a secondary bath temperature by regulating the inlet flow of helium-3 and/or regulating the rate of pumping off gaseous helium-3 through the secondary outlet means.

According to yet another aspect of the invention, a cryostat as defined above is used for cooling a sample, a detector element, a medical scanning device, a superconducting device, an electronic device or a combustion engine component. The term "sample" shall be understood as any portion of material intended for investigation, characterization or treatment, including, without limitation, samples for spectroscopy, for microscopy, for medical or veterinary diagnosis and for materials science. The term "detector element" may apply to devices suitable for detection techniques not limited to particular wavelength regions but notably including infrared, visible and ultraviolet regions, but also SQUID magnetometers. The term "electronic device" generally refers to electronic circuitry including classical and quantum computation devices.

According to a further aspect of the invention, a cryostat as defined above is used for spectroscopy, particularly for

- Raman spectroscopy
- photoemission spectroscopy
- infrared spectroscopy
- x-ray absorption spectroscopy
- resonant inelastic x-ray scattering
- inelastic neutron or x-ray scattering
- scanning tunneling spectroscopy diffraction measurements, particularly for
- x-ray diffraction on powders, single crystals and proteins
- neutron diffraction on powders and single crystals
- transmission electron microscopy on single crystals and proteins electronic property measurements, particularly for
- electrical transport property measurements such as Hall effect and resistivity
- thermoelectrical transport measurements such as Seebeck and Nernst effect, and thermal Hall effect
- polar Kerr effect measurements
- magnetization measurements with torque and SQUID.

According to a still further aspect of the invention, there is provided a device configured for being cooled by a cryostat. Such device may include, in particular, a device for carrying out spectroscopy, diffraction measurements or electronic property measurements.

According to another aspect of the invention, there is provided a sample holder configured to be attached to the cryostat. The term "configured to" shall include that the sample holder is compatible to the used cryostat dimensions and the attachment means. Such sample holder can provide a mechanical support for a sample and can provide means to keep the sample in position. The sample holder can be made from metallic and/or ceramic components and might be embodied in various designs, wherein a cylinder, arm, rod or pylon can be a typical form. The sample holder may comprise electrical/optical wiring or other means for electrical or optical conduct. The means for electrical or optical conduct may allow transmittance of information, charge, current, heat, electrical fields to the sample or to an area near the sample. The sample holder may comprise heating means to adjust the temperature near the sample. The sample holder may further comprise various sensors near the sample to measure various parameters including but not limited to temperature, light resp. optical parameters, pressure which can be adjusted to the needs of a specific application. The sample holder may be embodied in one, two or more parts. For example, in a two-part embodiment there may be a tip part which actually holds the sample and which is releasably connected to a base part which in turn is attachable to correspondingly configured attachment means of the cryostat. The tip part and the base part of the sample holder may be connected by means of a simple plug-in mechanism to allow a fast exchange of the first part.

According to one embodiment, the sample holder is adapted for the use in spectroscopy, particularly for Raman spectroscopy
photoemission spectroscopy
infrared spectroscopy
x-ray absorption spectroscopy
resonant inelastic x-ray scattering
inelastic neutron or x-ray scattering
scanning tunneling spectroscopy diffraction measurements, particularly for
x-ray diffraction on powders, single crystals and proteins
neutron diffraction on powders and single crystals
transmission electron microscopy on single crystals and proteins electronic property measurements, particularly for
electrical transport property measurements such as Hall effect and resistivity
thermoelectrical transport measurements such as Seebeck and Nernst effect, and thermal Hall effect
polar Kerr effect measurements
magnetization measurements with torque and SQUID.

According to a further embodiment, the sample holder is adapted for the use for cooling a sample, a detector device, a medical scanning device, a superconducting device, an electronic device or a combustion engine component.

The general challenge in building a cryostat is to shield the cold-finger cooled by liquid helium from the room temperature environment. In essence, the task is to protect the cold parts (the cold finger) from ambient temperature. A standard approach is to build the cryostat skeleton out of poor thermally conducting materials. In this fashion, thermal conduction from the external environment is minimized. Between this skeleton and cold finger, a heat exchanger is installed to counter-act against the heat load originating from the ambient environment. This heat exchanger is cooled by gaseous helium evaporating from the liquid helium bath, and for it to be efficient, an excellent thermal conducting material is used and the surface area between liquid and heat exchanger is optimized.

The present invention uses an entirely different approach. Like in a conventional cryostat, the skeleton is made out of a poorly conducting materials (Stainless steal, CoCr or polymer plastics). To minimize the heat load from the ambient environment, it is favorable to reduce the cross-section area of the skeleton structure. A crucial difference underlying the present invention is that the surface area of the skeleton is optimized. In this fashion, the skeleton, although poorly conducting, serves as a heat exchanger between cold exhaust gas and heat load from the ambient environment. Accordingly, the full cooling power of the liquid helium can be used directly to cool the coldest part of the cryostat where the sample is connected. In this manner, the full cooling power from the liquid can be used to cool down the sample and only the returning gas is used to cool down the cryostat skeleton. This makes the cryostat more efficient to counter-act against the heat-load from all the room-temperature environments. Only the part where the sample is connected is made out of excellent thermal conducting material (such as oxygen free copper, sapphire). To make the cryostat more efficient and get rid of the liquid nitrogen shielding we are able to connect the cooling shield directly to the skeleton over a relatively large area to have also an efficient heat exchange. The shielding is therefore connected to a heat exchanging structure which has a large area to provide enough cooling power to cool down the shielding to temperatures lower than 77K (i.e. liquid nitrogen temperature). All the above new concepts make it possible that the cryostat can be minimized to small diameters and also short lengths.

The present invention provides a new compact type of cryostat with a multitude of advantages over existing concepts and with abundant possibilities for novel cryotechnology applications. The novel and simplified design, translates directly into less overall construction material, shorter production time and hence greatly reduced manufacturing costs. In terms of functionality, the cryostat design has a cool down time which is substantially shorter than that of all existing designs. It thus opens new possibilities for activities with frequent sample changes. This is, for example, the case for neutron powder diffraction and studies of protein structures with either synchrotron radiation or transmission electron microscopy. In fact, using a cryostat according to the present invention, it makes sense to have a sample changing robot connected. The invention also paves the way for miniature helium-3 and dilution (helium-3 and helium-4 mixture) cryostats. With the emergence of quantum computing technology compact refrigeration is certainly going to be highly attractive. Compact cryotechnology also facilitates innovation in cold vacuum manipulation. Conventional cryostat principles are generally in conflict with in-situ vacuum motorization. The present invention opens for new solutions to this long-standing problem. The flexible cryostat geometry also provides novel heat shielding applications. Photon and electron analysers/detectors can benefit greatly from this technology. Finally, in combination with magnet-field instrumentation physical property measurement systems are straight forward applications.

The cryostat according to the present invention stands out for its compatibility with various scientific setups and environments, including, but not limited to four circle Euler cradles, xyz and Rz manipulators, robotics sample changers and warm bore magnets.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein are shown.

DETAILED DESCRIPTION OF THE INVENTION

Figure 1:
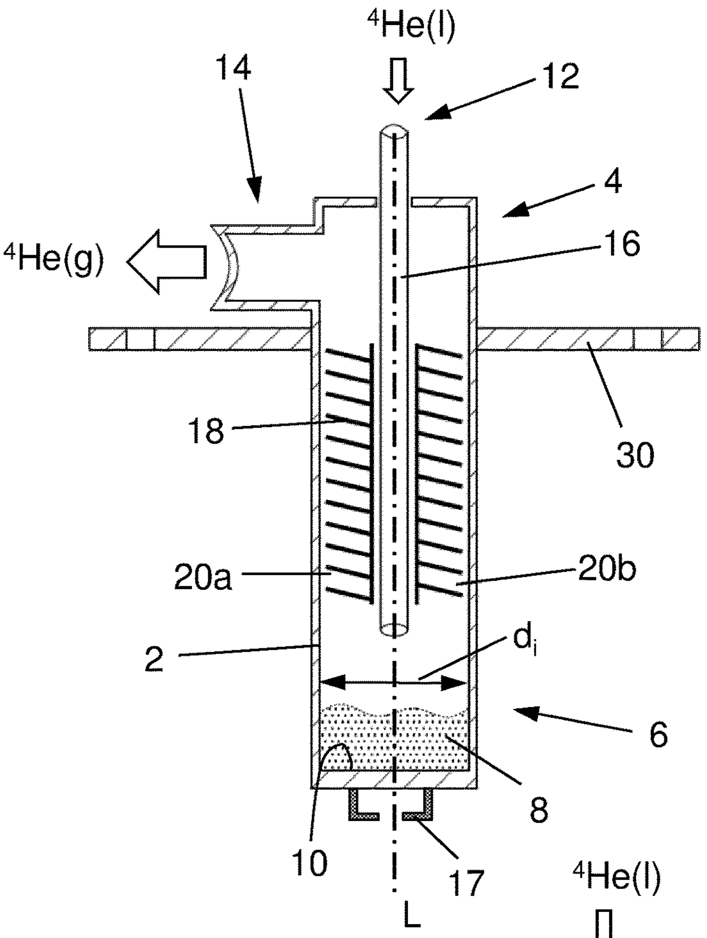
FIG. 1: a first embodiment of a cryostat, in a schematic vertical sectional view.

The cryostat shown in FIG. 1 comprises a primary chamber 2 with a main region 4 and a pot region 6 containing a bath 8 of liquid helium-4. The latter is confined by a bottom surface 10 of the primary chamber, which in the present example is configured as a cylindrical tube forming a pot at its bottom with inner diameter $d_i$ and a constant cylinder cross-sectional area of $$A_{cyl}=\pi/4d_i^2$$

If the cryostat is operated vertically as shown in FIG. 1, both the average liquid/gas surface area $A_s$ and the average cross-sectional area $A_c$ are equal to the cylinder cross sectional area $A_{cyl}$.

The cryostat also comprises inlet means 12 for introducing liquid helium-4 (denoted as $^4He(l)$) and outlet means 14 for releasing gaseous helium-4 (denoted as $^4He(g)$). Typically, the liquid helium-4 is supplied from an external storage container not shown in the figure which is coupled to the inlet means 12. The latter comprise a transfer line 16 extending into the main region 4. In the example shown the transfer line 16 is configured as a thin walled metal tube reaching down to the pot region 6 and ending just above the liquid helium-4 bath 8. Also shown in FIG. 1 are primary attachment means 17 disposed at the bottom of the pot region 6 for holding a sample not shown here.

In order to allow cryostat operation below 4.2 K under a continuous supply of liquid helium-4 at a reduced helium-4 pressure, gaseous helium-4 continuously evaporating from the bath is pumped off through the outlet means 14 by a suitable pumping system.

The primary chamber further comprises a baffle structure 18 with a heat exchanging area $A_H$. In the example of FIG. 1, the baffle structure defines two distinct flowpaths 20*a* and 20*b*, respectively, which direct the flow of gaseous helium-4. Each flowpath comprises a spiraled surface leading from the pot region 6 to the main region 4 in a detoured connection. As clearly shown in FIG. 1, there is no direct connection form the surface of the helium-4 bath 8 to the main region 4. One should note that a thin space between the cannular transfer line 16 and the baffle structure 18 is shown with an enhanced distance merely for illustration purposes. In practice, such a space will be either non-existent or so small that no substantial gas flow will occur therethrough. Advantageously, the ratio of heat exchanging area $A_H$ to average cross-sectional area $A_c$ is larger than one. In the example shown in FIG. 1, the baffle structure 18 comprising spiraled surfaces with several turns has a correspondingly large heat exchanging area $A_H$, and the above-mentioned area ratio is substantially larger than one.

In an exemplary embodiment, the cryostat main region had an inner diameter of 3 cm, and lengths of 30 and 85 cm have been used. The inner volumes were thus in the order of $5\times10^4$ cubic meters. Given that the surface area of the detouring/spiralling shall be larger than the average cross-sectional area of the pot region, the length of the heat exchanging section typically exceeds the length of the pot section. In the exemplary cryostat, the pot region had a height of 4 cm and an inner diameter of 15 mm.

Figure 2:
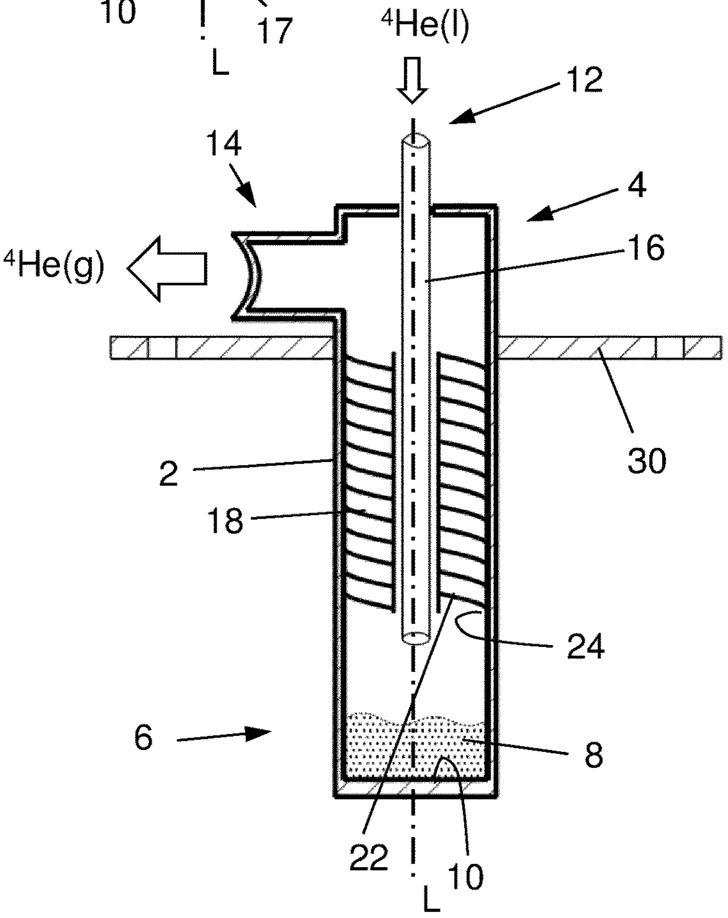
FIG. 2: a second embodiment of a cryostat, in a schematic vertical sectional view.

In the embodiment of FIG. 1, the baffle structure 18 is configured as a separate piece which is longitudinally inserted into the primary chamber 2 before assembly. In contrast, FIG. 2 shows an embodiment in which the baffle structure 18 is integrally formed with the primary chamber 2 by 3-D printing. In other words, every element 22 forming a spiraled surface is in integral connection with a corresponding inner wall region 24 of the primary chamber 2.

Figure 3:
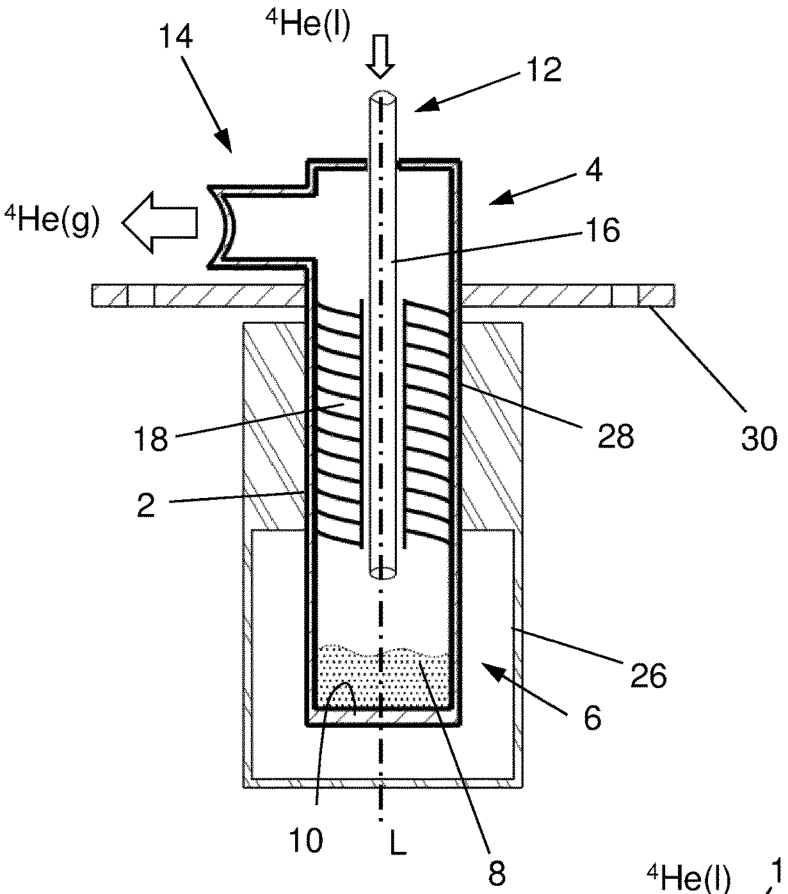
FIG. 3 a second embodiment of a cryostat, in a schematic vertical sectional view.

In the embodiment shown in FIG. 3, the cryostat comprises a radiation shield 26 disposed substantially surrounding the pot region 6 of the primary chamber 2. The radiation shield 26 is cooled by thermal contact to an outer wall portion 28 of the primary chamber surrounding the baffle structure 18.

Also shown in all of the figures is a flange 30 for vacuum tight connection to a vacuum chamber.

The bottom surface 10 of the primary chamber is typically used for attachment of a sample or other body that shall be cooled.

Figure 4:
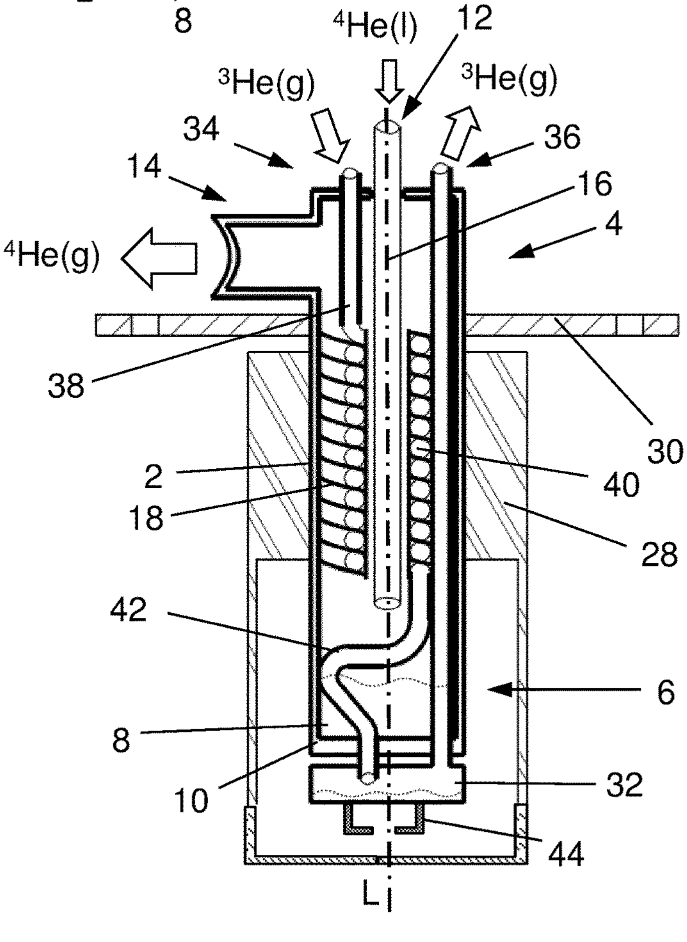
FIG. 4 a fourth embodiment of a cryostat, in a schematic vertical sectional view.

FIG. 4 shows a further embodiment wherein the cryostat further comprises a secondary chamber 32 for operation with helium-3, secondary inlet means 34 for helium-3 and secondary outlet means 36 for helium-3. In the example shown, the cryostat is configured for operation at a reduced helium-3 pressure in the secondary chamber 32, whereby gaseous helium-3 is pumped off through the secondary outlet means 36. Specifically, the secondary inlet means 34 comprise a cannular transfer line 38 which is configured for precooling supplied gaseous helium-3 (denoted as $^3He(g)$) by means of a curved section 40 formed to substantially follow a flowpath of the baffle structure, and by means of a meandering or spiraling section 42 formed in the cannular transfer line in a region thereof within the liquid helium-4 bath. Also shown in FIG. 4 are secondary attachment means 44 disposed at the bottom of the secondary chamber 32 for holding a sample not shown here.

Figure 5:
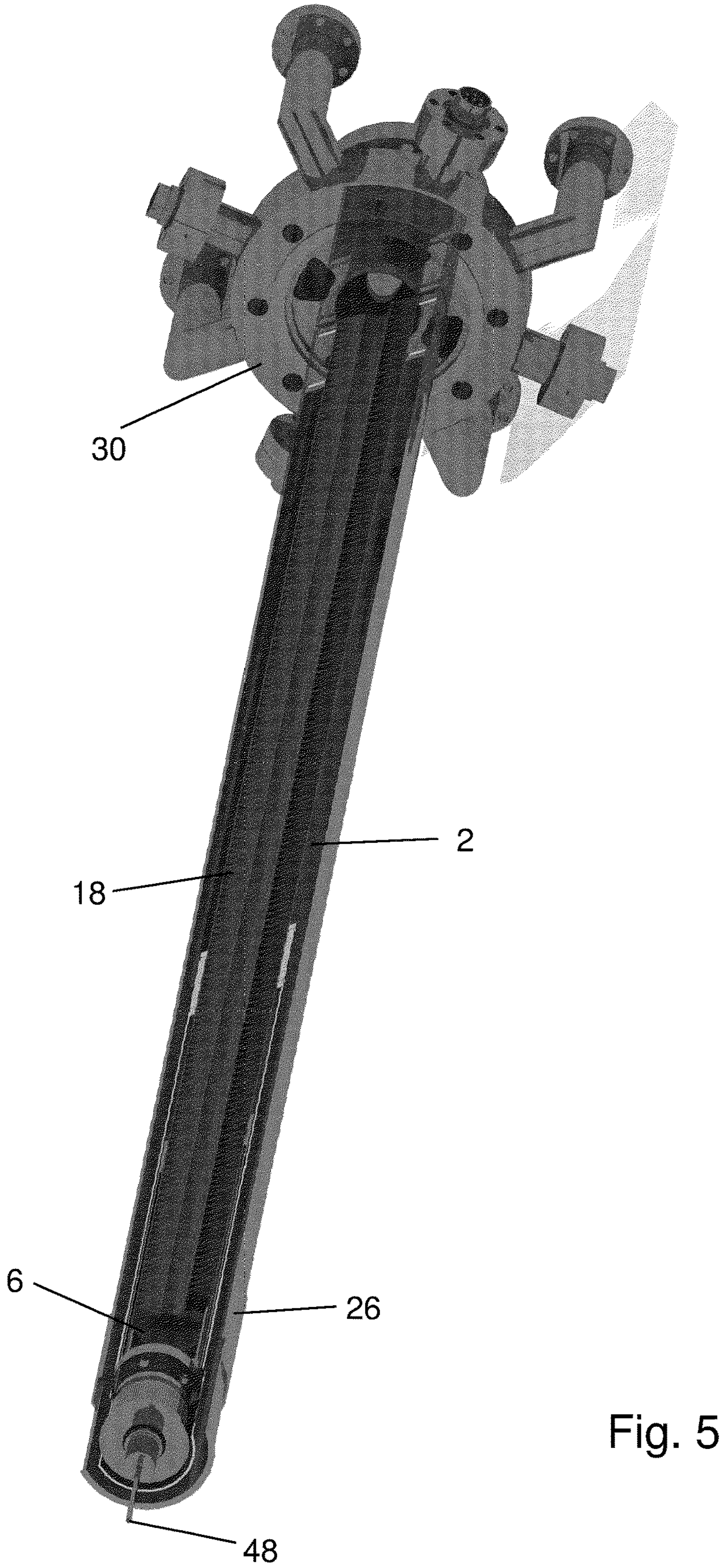
FIG. 5 a fifth embodiment of a cryostat, in a schematic perspective partially cut away view, FIG. 6 a lower part of the cryostat of FIG. 5, in an enlarged representation.
Figure 6:
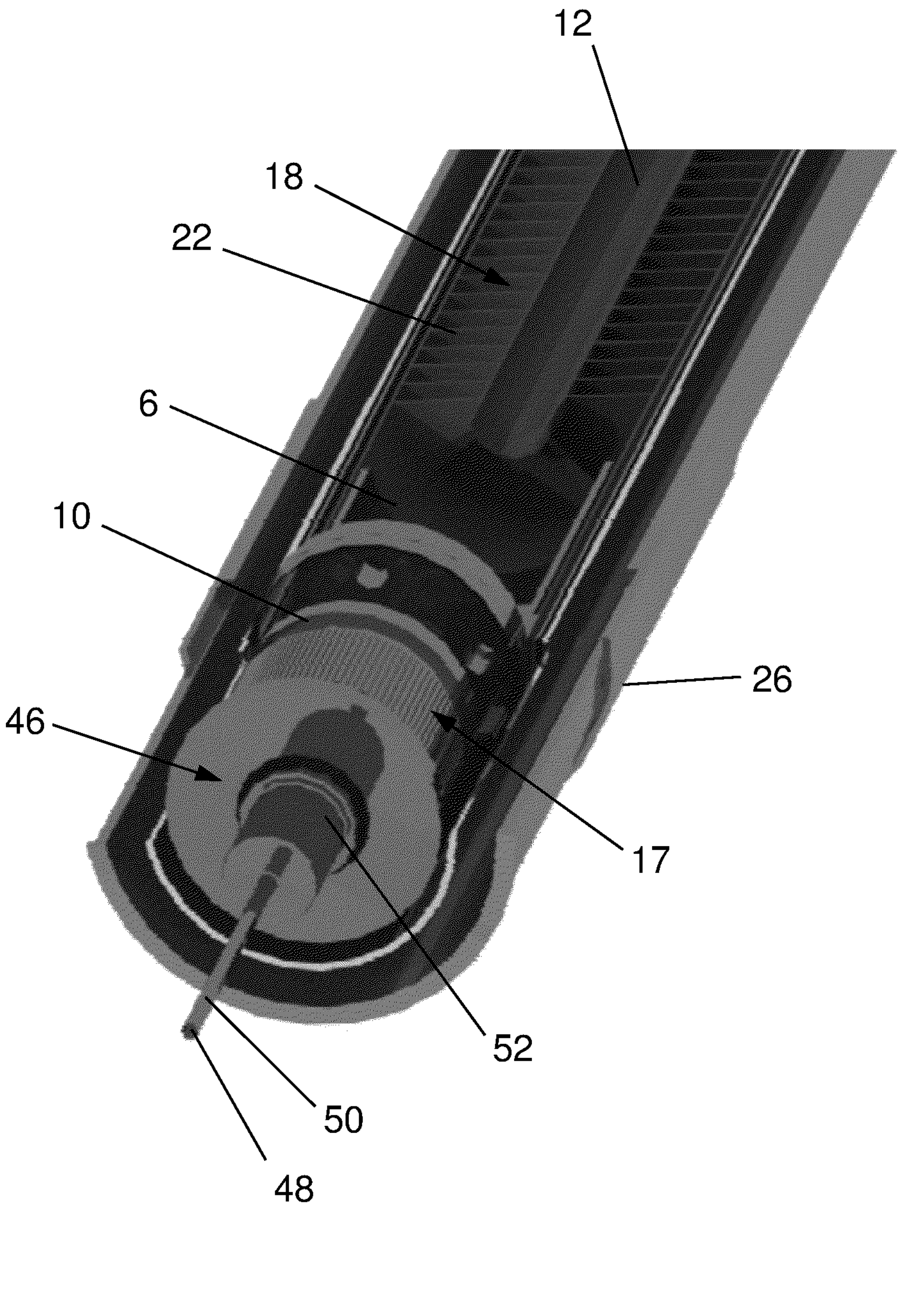
Figure 7:
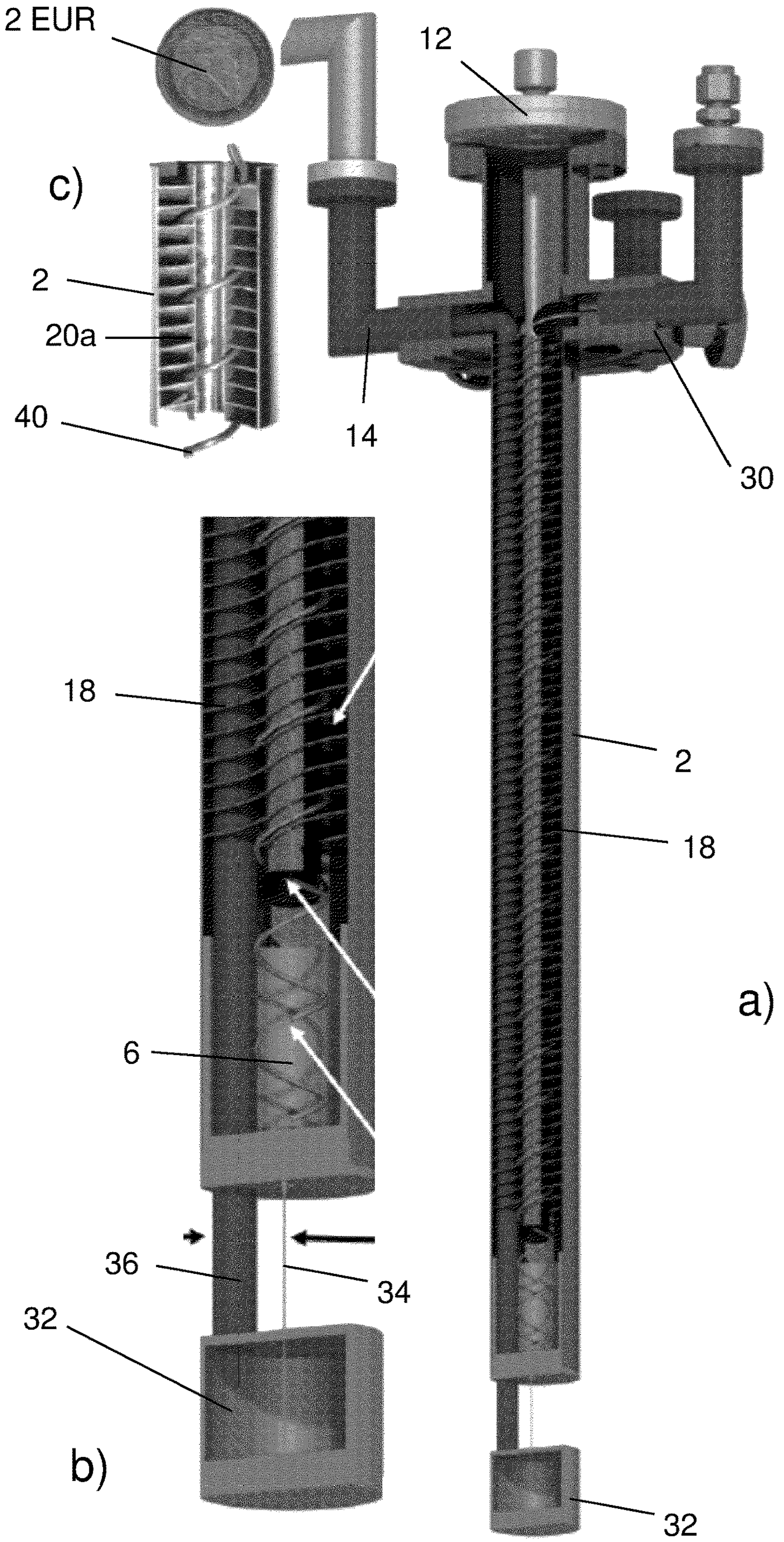
FIG. 7 a sixth embodiment of a cryostat, in a schematic perspective view.

Constructive examples of cryostats according to the invention are shown in FIGS. 5 to 7. The same reference numerals will be used to indicate features that are identical or functionally equivalent to those discussed in relation to FIGS. 1 to 4.

A cryostat system for use with helium-4 is shown in FIGS. 5 and 6. As shown in the enlarged view of FIG. 6, the bottom surface 10 underneath the pot region 6 is provided with a sample holder 46 holding a sample 48. The sample holder 46 is attached to the bottom surface 10 through primary attachment means 17 indicated schematically by an arrow. In the example shown, the sample holder 46 comprises a tip part 50 and a base part 52 which is pluggable into a correspondingly configured portion of the primary attachment means 17.

A cryostat system for use with helium 4 and helium-3 is shown in FIG. 7. The various components shown in the FIG. 7 have already been described in relation to FIGS. 1 to 4. FIG. 7*a*) shows the entire device, whereas FIG. 7*b*) shows its lower part in an enlarged view. In order to appreciate the degree of miniaturization achieved, FIG. 7*c*) shows a part of the primary chamber 2 in an enlarged view together with a 2 EUR coin, indicating that the primary chamber 2 and the complex structure contained therein do not exceed an outer diameter of about 25 mm.

LIST OF REFERENCE NUMERALS

2 primary chamber
4 main region
6 pot region
8 liquid helium-4 bath
10 bottom surface of 2
12 primary inlet means
14 primary outlet means 16 transfer line
17 primary attachment means
18 baffle structure
20*a,b* flowpath for gaseous helium-4
22 path element of 18
24 inner wall region of 2
26 radiation shield
28 outer wall portion of 2
30 flange
32 secondary chamber
34 secondary inlet means
36 secondary outlet means
38 transfer line
40 curved section
42 meandering or sprialling section
44 secondary attachment means
46 sample holder
48 sample
50 tip part of 46
52 base part of 46

The invention claimed is:

1. A cryostat for operation with liquid helium, comprising:
- a primary chamber comprising a main region and a pot region configured to contain a bath of liquid helium-4;
- a primary inlet configured for introduction of the liquid helium-4, the primary inlet comprising a transfer line extending into the primary chamber;
- a primary outlet configured for release of gaseous helium-4; and
- a baffle structure disposed in the primary chamber between the pot region and the main region, the baffle structure defining at least one flowpath for flow of the gaseous helium-4;
- wherein the baffle structure comprises a heat exchanging region with a heat exchanging area;
- wherein the heat exchanging region of the baffle structure has a thermal conductivity in the range of 0.01 W/(m K) to 10 W/(m K);
- wherein the cryostat is configured for operation under a continuous supply of the liquid helium-4;
- wherein the cryostat is configured for operation at a reduced pressure of the gaseous helium-4, whereby the gaseous helium-4 is pumped off through the primary outlet; and
- wherein the at least one flowpath forms a detoured connection between the pot region and the main region.

2. The cryostat according to claim 1, wherein a ratio of the heat exchanging area to an average liquid/gas surface area in the pot region is at least 1.

3. The cryostat according to claim 1, wherein the baffle structure comprises at least one spiraled surface leading from the pot region to the main region of the primary chamber.

4. The cryostat according to claim 1, wherein the baffle structure comprises an axial passage for receiving therein the transfer line.

5. The cryostat according to claim 4, wherein the axial passage is formed as a tubular section integrally connected to the baffle structure.

6. The cryostat according to claim 1, wherein the baffle structure, or the primary chamber, or both, are made by a 3D-printing technique.

7. The cryostat according to claim 1, further comprising a radiation shield disposed substantially surrounding at least the pot region of the primary chamber.

8. The cryostat according to claim 7, wherein the radiation shield is coolable by thermal contact with an outer wall portion of the primary chamber.

9. The cryostat according to claim 1, wherein the primary chamber is substantially cylindrical.

10. The cryostat according to claim 1, wherein an external surface of the pot region is configured for external attachment of a sample.

11. The cryostat according to claim 1, wherein the primary outlet comprises a coupling configured for connecting to a helium pumping device.

12. The cryostat according to claim 1, further comprising a secondary chamber configured for operation with helium-3, the secondary chamber comprising a secondary inlet and a secondary outlet for the helium-3.

13. The cryostat according to claim 12, wherein the cryostat is configured for operation at a reduced pressure of the helium-3, whereby gaseous helium-3 is pumped off through the secondary outlet.

14. The cryostat according to claim 12, wherein the secondary inlet comprises a cannular transfer line configured for precooling supplied helium-3 via one or both of:
- i) a curved section formed to substantially follow a flowpath of the at least one flowpath of the baffle structure; and
- ii) a meandering or spiraling section formed in the cannular transfer line in a region of the cannula transfer line within the bath of the liquid helium-4.

15. The cryostat according to claim 12, wherein an external surface of the secondary chamber is configured with a secondary attachment member for external attachment of a sample.

16. A method for operating the cryostat of claim 1, comprising:
- evaporatively cooling the pot region by suppling the liquid helium-4 from a first external reservoir through the primary inlet into the pot region at least until the bath of liquid helium-4 begins to accumulate along a bottom surface of the pot region; and
- maintaining a temperature of the bath of the liquid helium-4 by regulating the supply of the liquid helium-4, or regulating a rate of the pumping off of the gaseous helium-4 through the primary outlet, or controlling heating of the cryostat, or combinations thereof.

17. The method according to claim 16, wherein the temperature of the bath of the liquid helium-4 is maintained within a range of about 1.4 K to about 1.5 K.

18. The method according to claim 17,
- wherein the cryostat further comprises a secondary chamber configured for operation with helium-3, the secondary chamber comprising a secondary inlet and a secondary outlet for the helium-3, and the cryostat configured for operation at a reduced pressure of the helium-3, whereby gaseous helium-3 is pumped off through the secondary outlet; and
- wherein the method further comprises supplying the helium-3 from a second external reservoir through the secondary inlet into the secondary chamber, thereby evaporatingly cooling the secondary chamber at least until a bath of liquid helium-3 is formed, and maintaining a temperature of the bath of the liquid helium-3 by regulating the supply of the helium-3, or regulating a rate of the pumping off of the gaseous helium-3 through the secondary outlet, or both.

19. A method of using the cryostat of claim 1, comprising cooling at least one of a sample, a detector device, a medical scanning device, a superconducting device, an electronic device, and a combustion engine component.

20. A method of using the cryostat of claim 1 for spectroscopy, or diffraction measurements, or electronic property measurements, or combinations thereof.

21. A device configured for being cooled by the cryostat according to claim 1.

22. A sample holder configured for attachment to the cryostat according to claim 1.

23. The sample holder according to claim 22, wherein the sample holder is configured for use for spectroscopy, or diffraction measurements, or electronic property measurements, or combinations thereof.

24. The sample holder according to claim 22, wherein the sample holder is configured for use for cooling at least one of a sample, a detector device, a medical scanning device, a superconducting device, an electronic device, and a combustion engine component.

* * * * *